US009467957B2

United States Patent
Khude et al.

(10) Patent No.: US 9,467,957 B2
(45) Date of Patent: Oct. 11, 2016

(54) METHOD AND APPARATUS FOR RESOURCE ALLOCATION FOR DISTRIBUTED DEVICE TO DEVICE SYNCHRONIZATION

(71) Applicant: QUALCOMM Incorporated, San Diego, CA (US)

(72) Inventors: Nilesh Nilkanth Khude, Bridgewater, NJ (US); Sebastien Henri, Paris (FR); Vincent Douglas Park, Budd Lake, NJ (US); Junyi Li, Chester, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 167 days.

(21) Appl. No.: 14/160,381

(22) Filed: Jan. 21, 2014

(65) Prior Publication Data

US 2015/0208368 A1    Jul. 23, 2015

(51) Int. Cl.
```
H04L 29/06      (2006.01)
H04W 56/00     (2009.01)
H04W 28/02     (2009.01)
H04W 68/02     (2009.01)
H04W 72/04     (2009.01)
H04W 8/00      (2009.01)
```

(52) U.S. Cl.
CPC .......... *H04W 56/001* (2013.01); *H04W 8/005* (2013.01); *H04W 28/0252* (2013.01); *H04W 56/002* (2013.01); *H04W 68/02* (2013.01); *H04W 72/048* (2013.01)

(58) Field of Classification Search
CPC . H04L 67/42; H04L 29/06; H04L 29/06027; H04M 15/00
See application file for complete search history.

(56) References Cited

U.S. PATENT DOCUMENTS

| | | | | |
|---|---|---|---|---|
| 8,385,316 B2* | 2/2013 | Laroia | ................. | H04W 56/002 370/350 |
| 2006/0045053 A1* | 3/2006 | Erlich | .................. | H04B 1/7156 370/338 |
| 2009/0122783 A1 | 5/2009 | Tanaka et al. | | |
| 2013/0083779 A1 | 4/2013 | Ahn et al. | | |

FOREIGN PATENT DOCUMENTS

| | | |
|---|---|---|
| WO | 2009009314 A1 | 1/2009 |
| WO | 2011161560 A1 | 12/2011 |

(Continued)

OTHER PUBLICATIONS

International Search Report and Written Opinion—PCT/US2015/012146—ISA/EPO—Apr. 24, 2015.

*Primary Examiner* — Fan Ng
(74) *Attorney, Agent, or Firm* — Arent Fox LLP

(57) ABSTRACT

A method, an apparatus, and a computer program product for wireless communication are provided in connection with improving resource allocation for distributed D2D synchronization in densely populated communications systems. In an example, a communications device is equipped to transmit a synchronization signal during a beacon period of a synchronization channel. In an aspect, the synchronization channel may include the beacon period, a paging period, and a TIB period. The communications device may further be equipped to monitor at least one of the beacon period, the paging period, or the TIB period of the synchronization channel for one or more signals from one or more UEs in a D2D network, and determine whether to transmit information during at least one of the beacon period, the paging period, or the TIB period based at least in part on the monitoring.

30 Claims, 13 Drawing Sheets

(56) References Cited

FOREIGN PATENT DOCUMENTS

| WO | 2012035367 | A1 | 3/2012 |
| WO | 2013002688 | A1 | 1/2013 |
| WO | 2013066126 | A1 | 5/2013 |

* cited by examiner

METHOD AND APPARATUS FOR RESOURCE ALLOCATION FOR DISTRIBUTED DEVICE TO DEVICE SYNCHRONIZATION

BACKGROUND

1. Field

The present disclosure relates generally to communication systems, and more particularly, to resource allocation for distributed device to device (D2D) synchronization in densely populated communications systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards that provide a common protocol that enables different wireless devices to communicate on a municipal, national, regional, and even global level. An example of a telecommunication standard is LTE. LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may also support direct device-to-device (peer-to-peer) communication.

In a D2D communication system where user equipments (UEs) may not have access to any source of synchronization (e.g., wireless access network (WAN) based, global positing system (GPS) receiver based, etc.), the UEs may achieve synchronizations through use of a distributed protocol. In such a protocol, resources for synchronization (e.g., synchronization channel resources) may be allocated on a slow time scale (e.g. once every second) to reduce battery expenditure as well as the amount of resources used for the synchronization. Further, multiple UEs may transmit in multiple broadcast resources available in the synchronization channel, and may receive the transmissions on these resources to obtain timing structure information, frame structure information, time and frequency corrections, information related to other channels' allocations, etc.

In a densely populated D2D communication system, these synchronization channel resources may be heavily reused as all the UEs attempt to transmit in each occurrence of the synchronization channel. Such transmission may interfere with each other and cause failures and/or reduce the UEs ability to decode the information in the broadcast message. Such interference may also make timing and frequency measurements erroneous.

As such, a system and method to improve synchronization channel design for densely populated D2D communication systems may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving resource allocation for distributed D2D synchronization in densely populated communications systems. In an example, a communications device is equipped to transmit a synchronization signal during a beacon period of a synchronization channel. In an aspect, the synchronization channel may include the beacon period, a paging period, and a timing information block (TIB) period. The communications device may further be equipped to monitor at least one of the beacon period, the paging period or the TIB period of the synchronization channel for one or more signals from one or more UEs in a D2D network, and determine whether to transmit information during at least one of the beacon period, the paging period or the TIB period based at least in part on the monitoring.

According to related aspects, a method for improving resource allocation for distributed D2D synchronization in densely populated communications systems is provided. The method can include transmitting, by a UE, a synchronization signal during a beacon period of a synchronization channel. In an aspect, the synchronization channel may include the beacon period, a paging period, and a TIB period. Further, the method can include monitoring at least one of the beacon period, the paging period or the TIB period of the synchronization channel for one or more signals from one or more UEs in a D2D network. Moreover, the method may include determining whether to transmit information during at least one of the beacon period, the paging period or the TIB period based at least in part on the monitoring.

Another aspect relates to a communications apparatus enabled to improve resource allocation for distributed D2D synchronization in densely populated communications systems. The communications apparatus can include means for transmitting a synchronization signal during a beacon period of a synchronization channel. In an aspect, the synchronization channel may include the beacon period, a paging period, and a TIB period. Further, the communications apparatus can include means for monitoring at least one of the beacon period, the paging period or the TIB period of the synchronization channel for one or more signals from one or more UEs in a D2D network. Moreover, the communications apparatus can include means for determining whether to transmit information during at least one of the paging period or the TIB period based at least in part on the monitoring.

Another aspect relates to a communications apparatus. The apparatus can include a processing system configured to transmit a synchronization signal during a beacon period of a synchronization channel. In an aspect, the synchronization channel may include the beacon period, a paging period, and a TIB period. Further, the processing system may be configured to monitor at least one of the beacon period, the paging period or the TIB period of the synchronization channel for one or more signals from one or more UEs in a D2D network. Moreover, the processing system may further be configured to determine whether to transmit information during at least one of the paging period or the TIB period based at least in part on the monitoring.

Still another aspect relates to a computer program product of a UE, which can have a computer-readable medium including code for transmitting, by the UE, a synchronization signal during a beacon period of a synchronization channel. In an aspect, the synchronization channel may include the beacon period, a paging period, and a TIB period. Further, the computer-readable medium may include code for monitoring at least one of the beacon period, the paging period or the TIB period of the synchronization channel for one or more signals from one or more UEs in the D2D network. Moreover, the computer-readable medium can include code for determining whether to transmit information during at least one of the paging period or the TIB period based at least in part on the monitoring.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
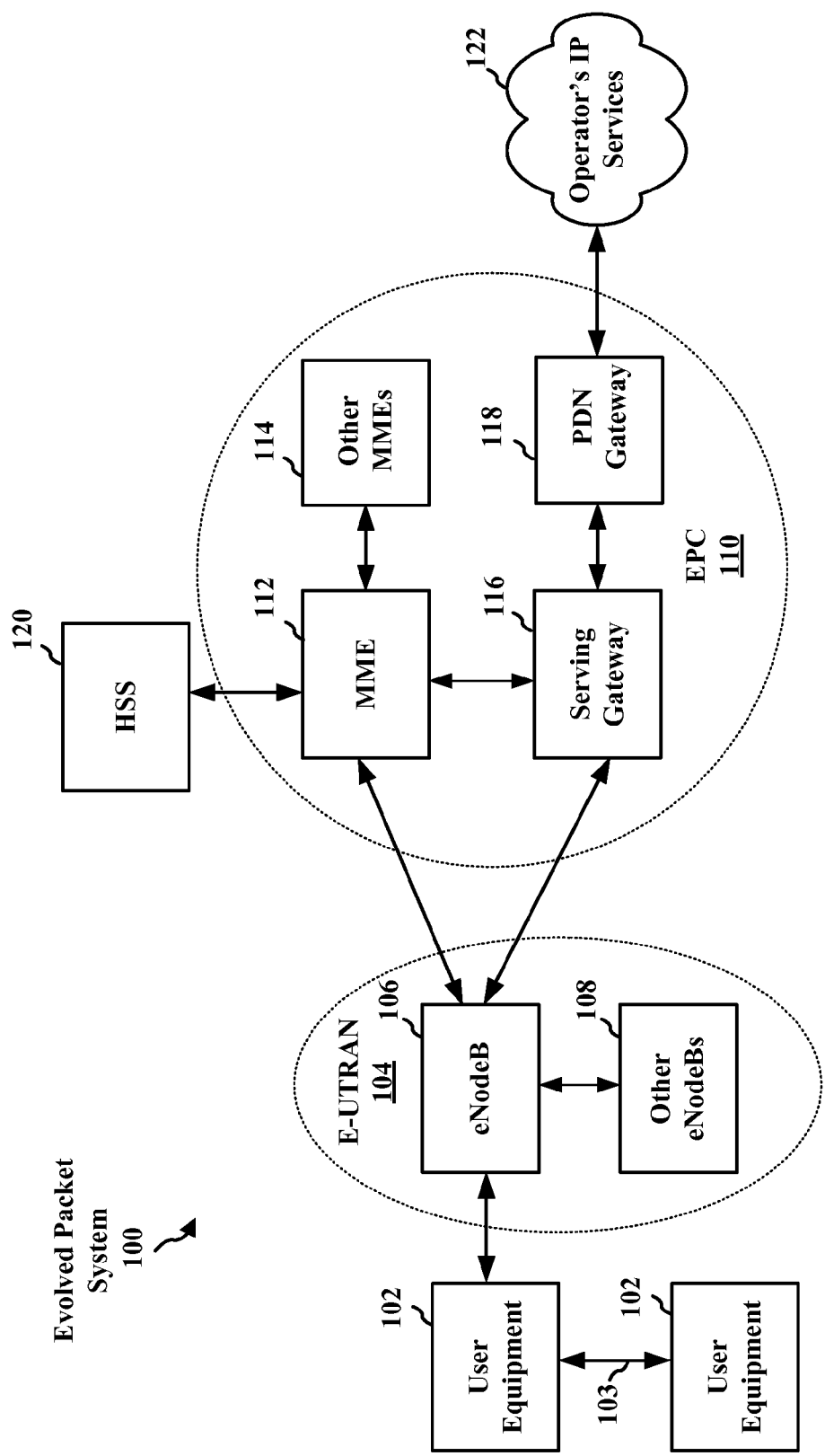
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UEs 102 may form a D2D connection 103. In an aspect, the D2D connection 103 may be configured to allow the UEs 102 to communicate with each other. In another aspect, a UE 102 may act as a leader of a group of UEs that are able to communicate with each other using the D2D connection 103. Examples of D2D connection 103 are provided with reference to IEEE 802.11p based communications. IEEE 802.11p based dedicated short range communications (DSRC) wave systems provide a basic safety message format where devices (e.g., vehicles) periodically may announce their position, velocity and other attributes to other devices (e.g., other vehicles) allowing the neighboring traffic to track their positions and avoid collisions, improve traffic flow, etc. Further, the communication protocols in these systems do not preclude pedestrians (with their user equipment (UEs)) from utilizing this spectrum and periodically transmitting the basic safety messages which can indicate information such as their presence to vehicles around them.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
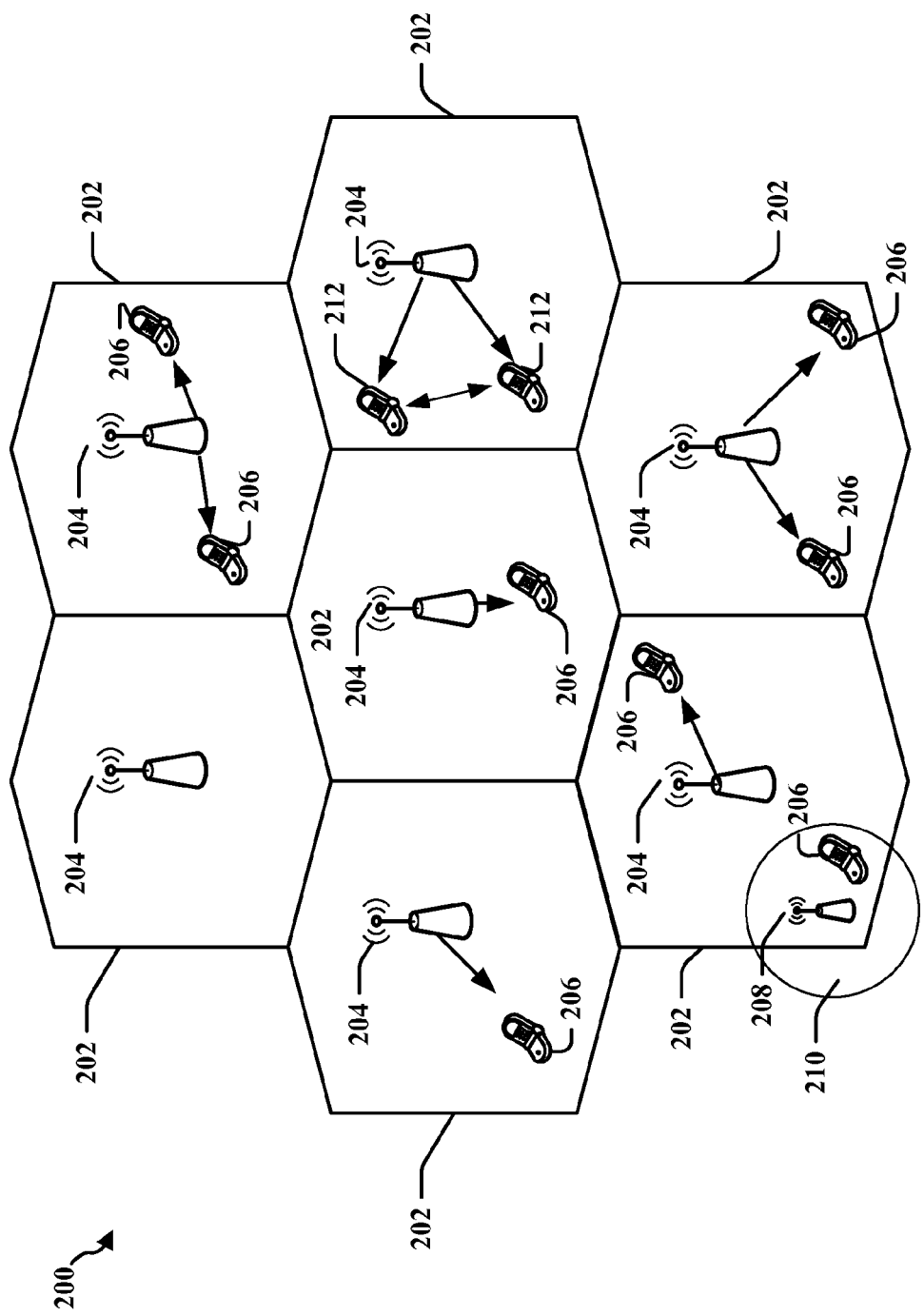
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
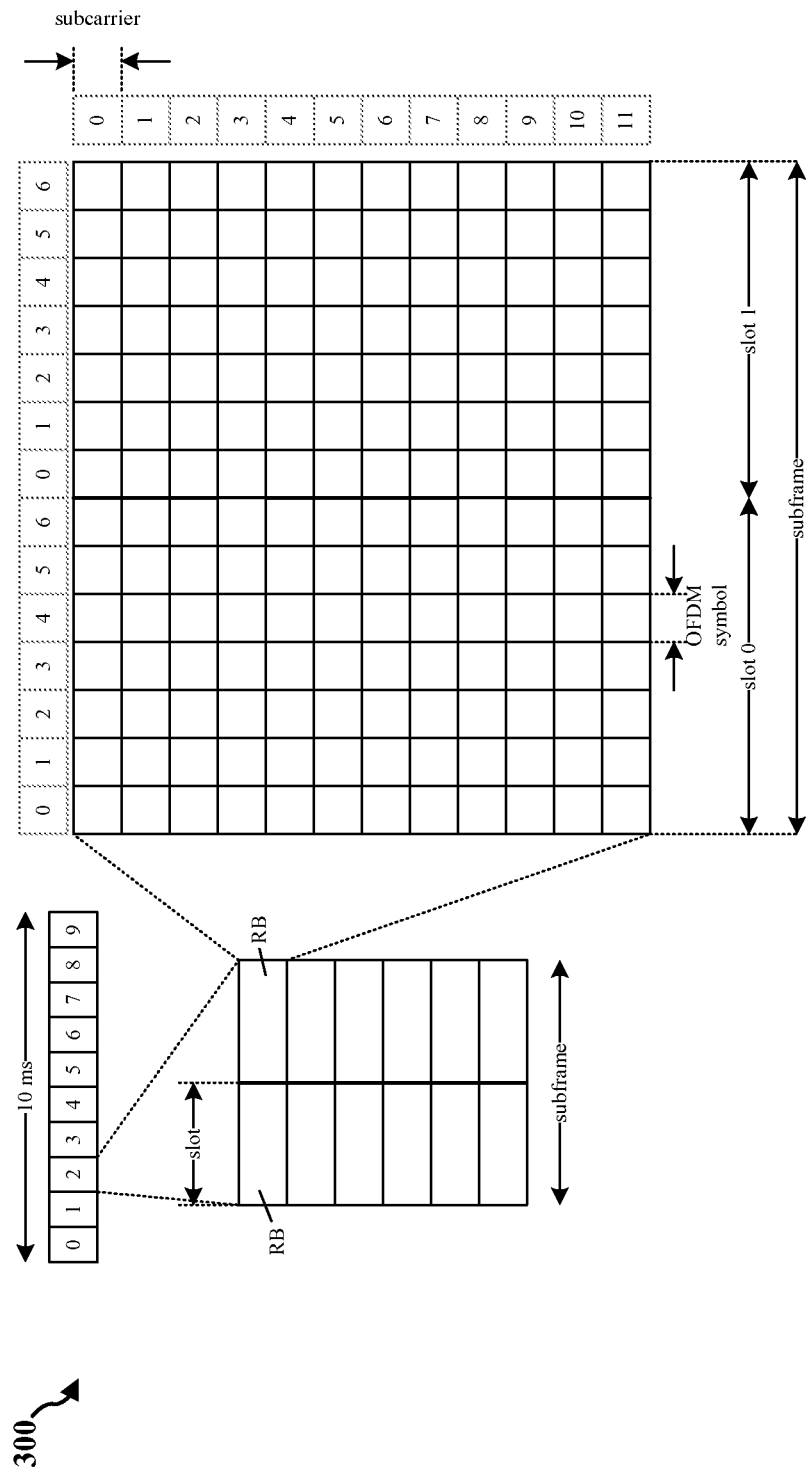
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
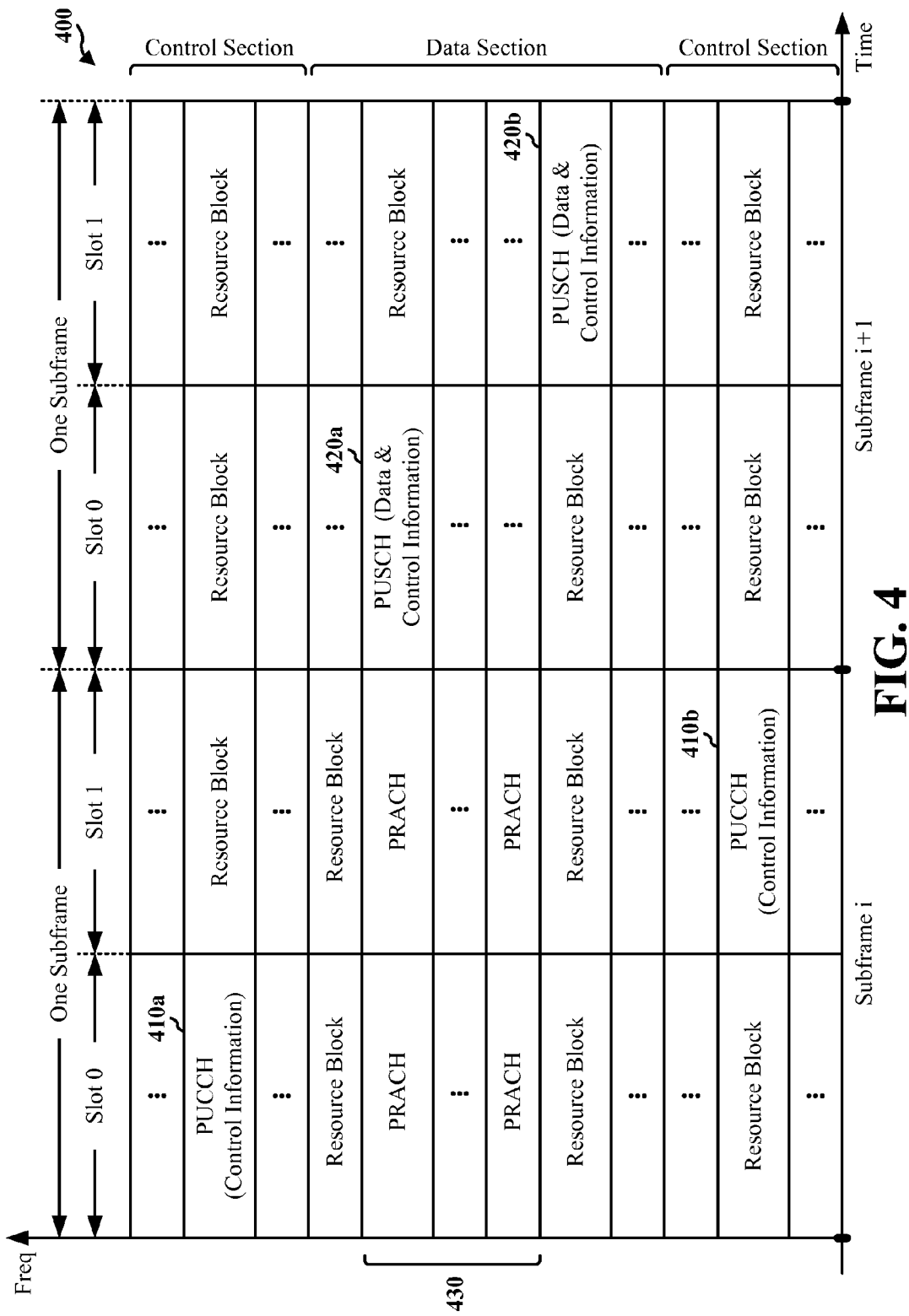
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
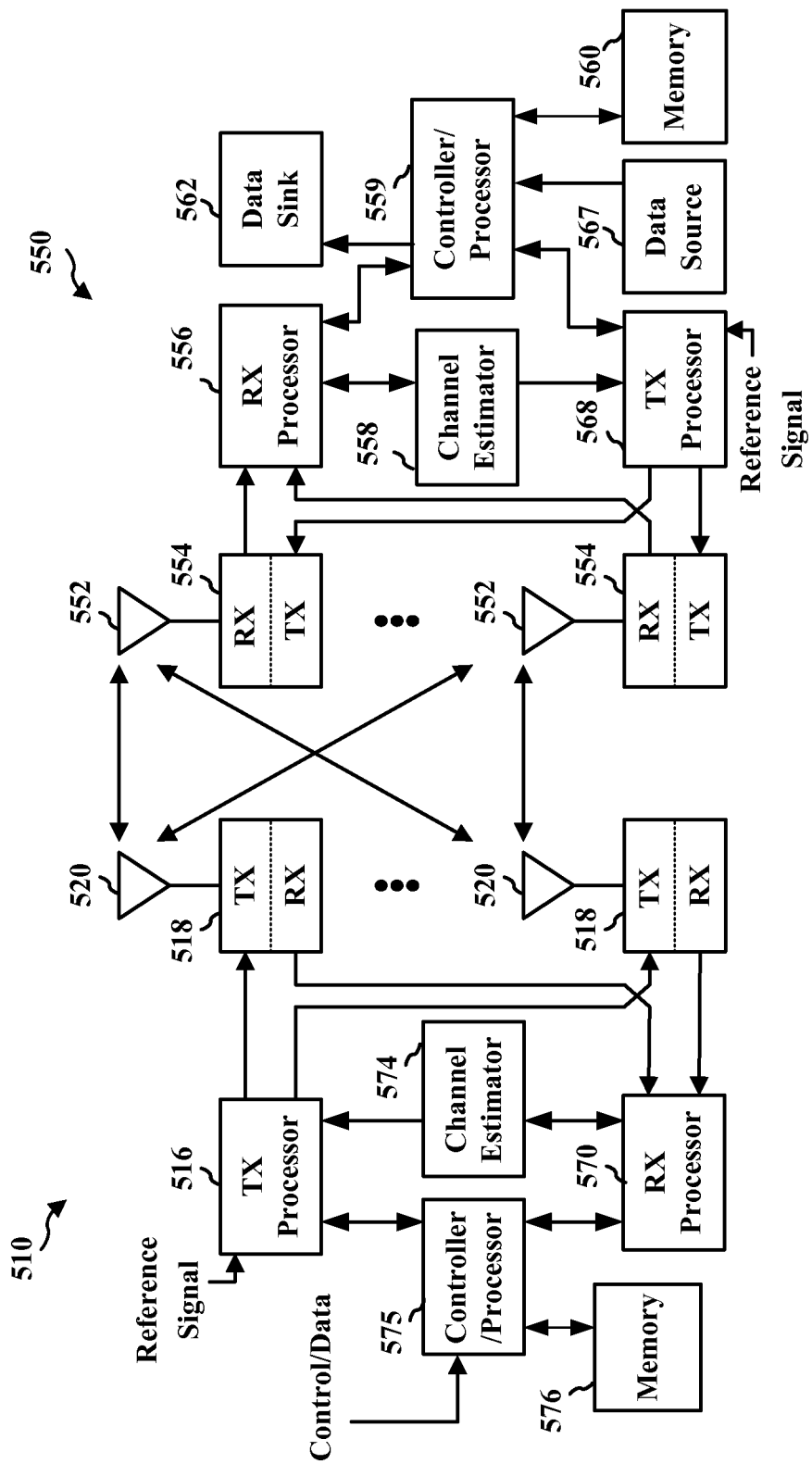
FIG. 5 is a diagram illustrating an example of an evolved Node B and user equipment in an access network.

FIG. 5 is a block diagram of an eNB 510 in communication with a UE 550 in an access network. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission.

At the UE 550, each receiver 554RX receives a signal through its respective antenna 552. In another aspect, UE 550 may communicate with other UEs similarly to how UE 550 communicates with eNB 510. Each receiver 554RX recovers information modulated onto an RF carrier and provides the information to the receive (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In the UL, a data source 567 is used to provide upper layer packets to the controller/processor 559. The data source 567 represents all protocol layers above the L2 layer. Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

Figure 6:
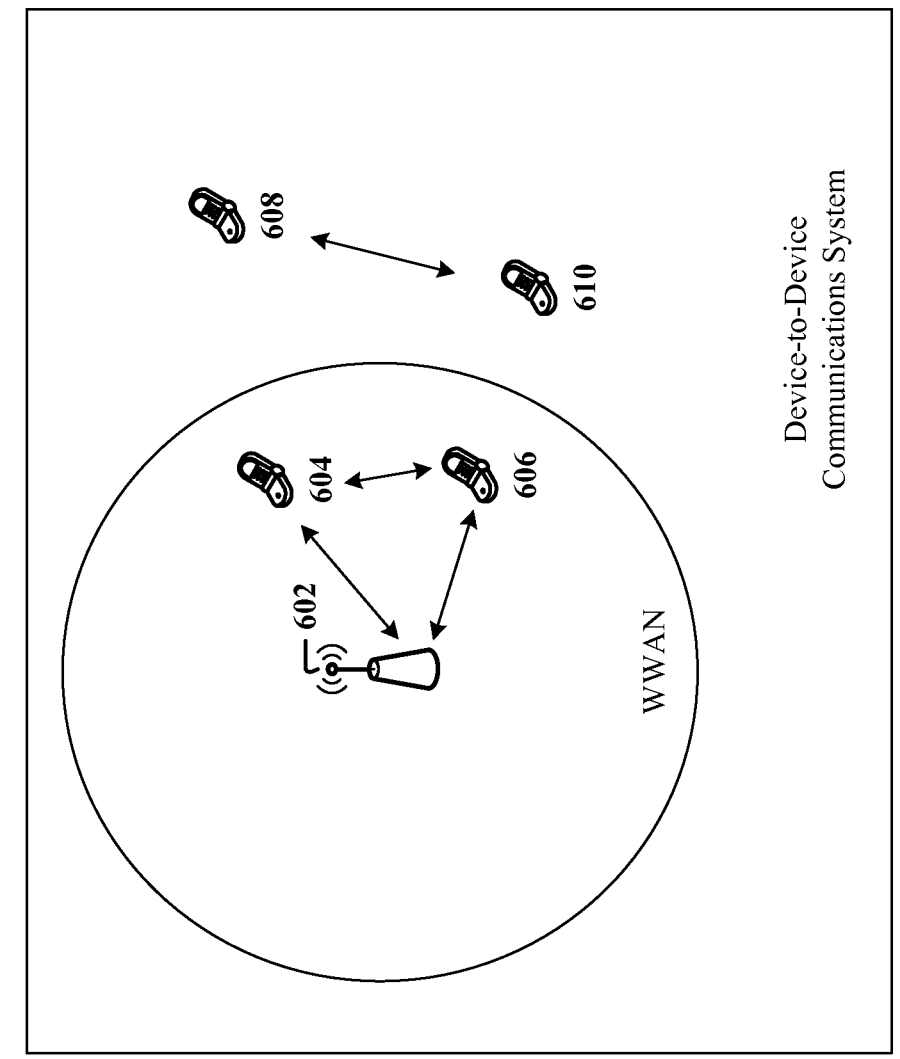
FIG. 6 is a diagram illustrating a device-to-device communications network.

FIG. 6 is a diagram of a device-to-device communications system 600. The device-to-device communications system 600 includes a plurality of wireless devices 604, 606, 608, 610. The device-to-device communications system 600 may overlap with a cellular communications system, such as for example, a wireless wide area network (WWAN). Some of the wireless devices 604, 606, 608, 610 may communicate together in device-to-device communication using the DL/UL WWAN spectrum, some may communicate with the base station 602, and some may do both. For example, as shown in FIG. 6, the wireless devices 608, 610 are in device-to-device communication and the wireless devices 604, 606 are in device-to-device communication. The wireless devices 604, 606 are also communicating with the base station 602.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 7:
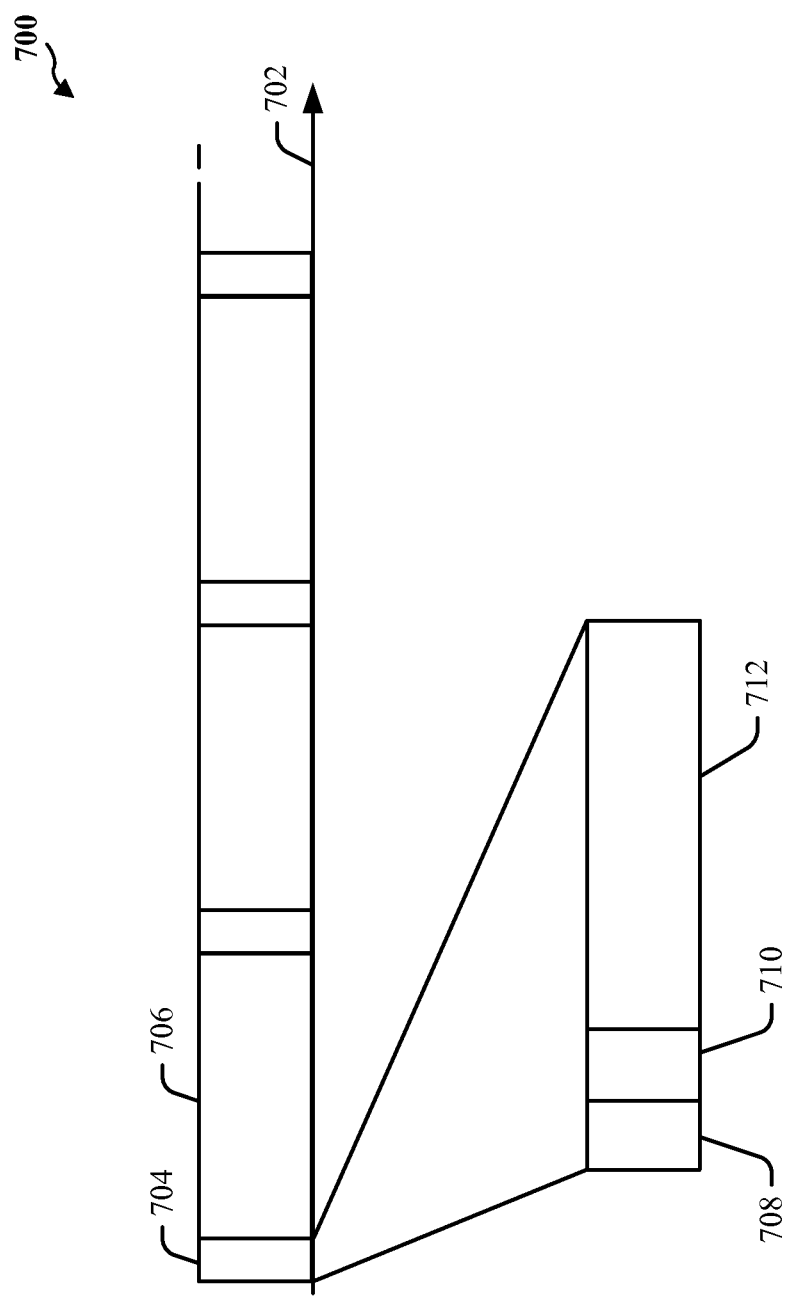
FIG. 7 is block diagram illustrating device-to-device communications network timing structures as time progresses, according to an aspect.

FIG. 7 is block diagram representing a communication structure 700 for a D2D communication system as time 702 progresses. The structure may be used by any UEs in the D2D communication system.

As depicted in FIG. 7, the communication structure 700 may include a synchronization period 704 and a communication period 706. As described herein, the synchronization period 704 may also be referred to as a synchronization channel.

In an aspect, the synchronization period 704 may divided into three periods (e.g., sub-channels) including a beacon period 708, a paging period 710, and a timing information block (TIB) broadcast period 712.

In an aspect, during the beacon period 708, all the UEs following the same timing structure may transmit in the resources in the beacon period. As there may be few (e.g., 1-2) resources in the beacon period 708, multiple UEs may transmit on the same resources. In such an aspect, information transmitted during the beacon period 708 may be specific to the timing structure rather than a transmitting UE. In other words, multiple UEs transmitting in a resource in the beacon period 708 may transmit the same synchronization signal.

In an aspect, the paging period 710 may be allocated as a random access sub-channel. As such, transmissions during the paging period 710 may be event driven. In other words, a UE may not transmit on the paging resources in a periodic manner. In an aspect, an event that may trigger a transmission during the paging period 710 may include detection of a synchronization signal transmission in the beacon period 708 without being able to decode any TIB broadcast messages. This case may arise when only a subset of UEs may transmit TIB broadcast messages and there may not exist a TIB transmission in the vicinity of the UE. The UE may then request a broadcast transmission of detailed timing information in the TIB broadcast period 712. In another aspect, an event that may trigger a transmission during the paging period 710 may include a UE determination that the TIB broadcast period 712 is overly congested. The UE may transmit information on a random access resource in the paging period 710 to indicate congestion of resources in the TIB broadcast period 712. For example, where a GPS enabled UE cannot find a locally unused TIB resource, the UE may indicate the resource congestion by transmitting information on a random access resource in the paging period 710. In still another aspect, an event that may trigger a transmission during the paging period 710 may include a UE indicating some information, such as but not limited to, availability of a better timing structure within the local vicinity by transmitting information on a random access resource in the paging period 710.

In an aspect, the TIB broadcast period 712 may include multiple resources (e.g., 10-20 resources) that may be designed to be orthogonal to each other. Further, resources in the TIB broadcast period 712 may be reused by UEs that are not in the local vicinity. In an aspect, only a subset of UEs may transmit on one of the resources available in the TIB period 712. In such an aspect, a UE may determine whether to transmit during the TIB period based on information received through a WAN, information received during the paging period 710, etc. In an aspect, the information transmitted on the resources during the TIB period 712 may include but is not limited to: frame structure information used in the timing structure, the age of the timing structure (e.g., a time elapsed since the timing structure was created), a resource ID on which the information is being transmitted, other timing related information that the UE may decide to transmit (such as the presence of another timing structure in the neighborhood, etc.), etc. In another aspect, the information transmitted during the TIB period may span multiple synchronization period 704 occurrences. In still another aspect, the information transmitted on resources during the TIB period may be specific to the transmitting UE (e.g., a MAC ID of the transmitter, a duration the UE intends to continue to transmit on the resource, a preference as to whether the UE prefers to transmit resources during the TIB period, etc.).

Figure 8:
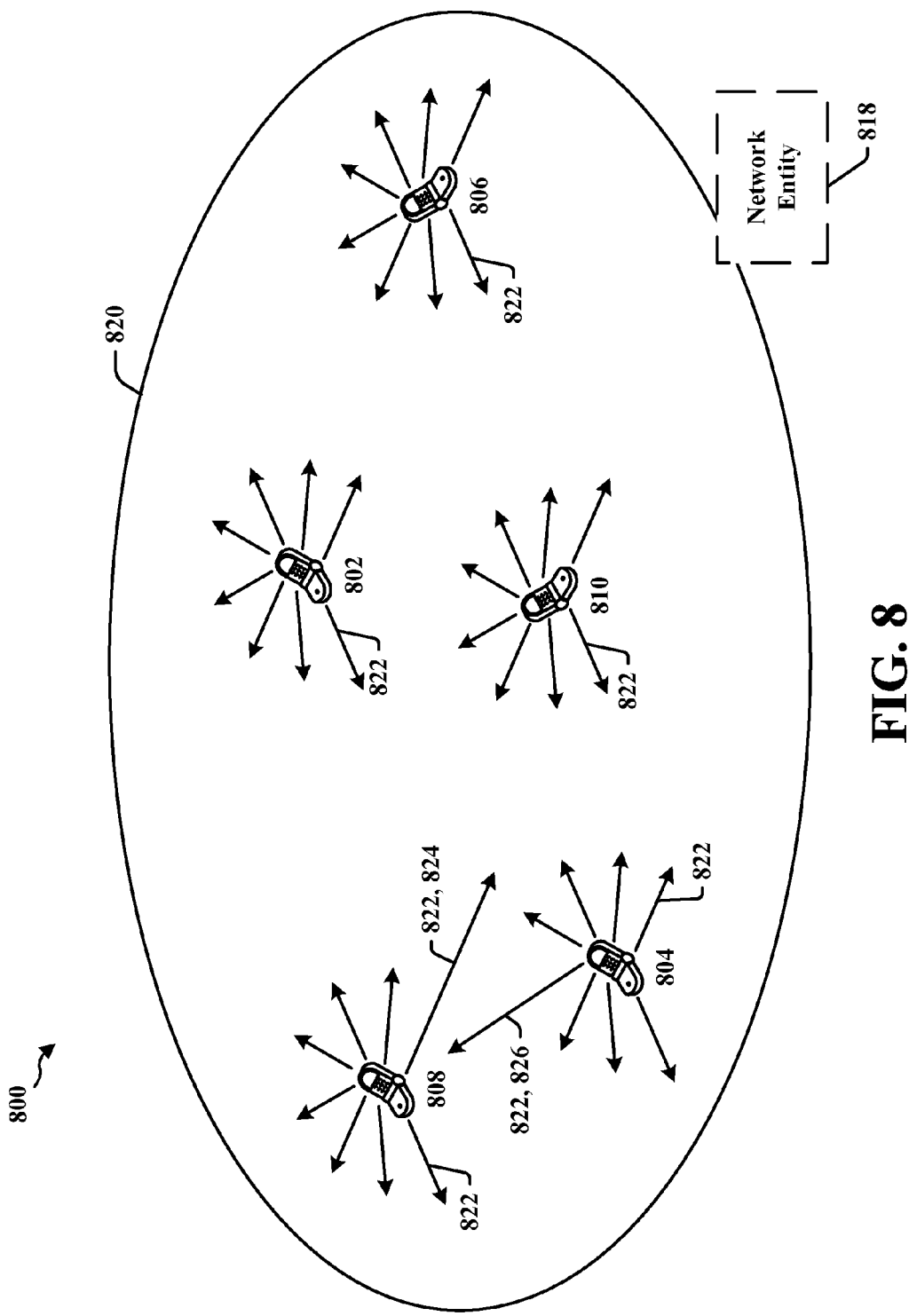
FIG. 8 is a diagram illustrating a device-to-device communications network that is configured to improve resource allocation for distributed D2D synchronization, according to an aspect.

FIG. 8 is a diagram of a communications system 800 that is configured to support D2D communications.

In an aspect, multiple UEs (e.g., 802-810) may synchronize to a common timing structure within a D2D communication group 820. The UEs 802-810 may synchronize using a distributed D2D synchronization protocol, such as described above with reference to FIG. 7. As described above, each UE (e.g., 802-810) may transmit D2D communication group 820 information 822 during a beacon period of a synchronization period. In such an aspect, information 822 transmitted during the beacon period may be specific to the D2D communication group 820 timing structure rather than a transmitting UE (e.g., 802-810). In other words, multiple UEs (e.g., 802-810) transmitting in a resource in the beacon period may transmit the same synchronization signal 822.

In an operational aspect, one or more UEs (e.g., UE 808) may transmit a signal 824 during a paging period based on the occurrence of one or more events. For example, an event that may trigger a transmission 824 during the paging period may include detection of a beacon transmission without being able to decode any TIB broadcast messages. In another aspect, an event that may trigger a transmission 824 during the paging period may include a UE determination that the TIB broadcast period is overly congested. The UE may transmit information 824 on a random access resource in the paging period to indicate congestion of resources in TIB broadcast period. For example, where a GPS enabled UE cannot find a locally unused TIB resource, the UE may indicate the resource congestion by transmitting information 824 on a random access resource in the paging period. In still another aspect, an event that may trigger a transmission 824 during the paging period may include a UE indicating some information, such as but not limited to, availability of a better timing structure within the local vicinity by transmitting information 824 on a random access resource in the paging period.

Further, in an operational aspect, one or more UEs (e.g., UE 804) may transmit a signal 826 during a TIB broadcast period. In an aspect, only a subset of UEs may transmit a signal 826 on one of the resources available in the TIB period. In such an aspect, a UE may determine whether to transmit during the TIB period based on information received through a WAN 818, information 824 received during the paging period, etc. In an aspect, the information 826 transmitted on resources during the TIB period may be specific to the transmitting UE (e.g., a MAC ID of the transmitter, a duration the UE intends to continue to transmit on the resource, a preference as to whether the UE prefers to transmit resources during the TIB period, etc.).

Figure 9A:
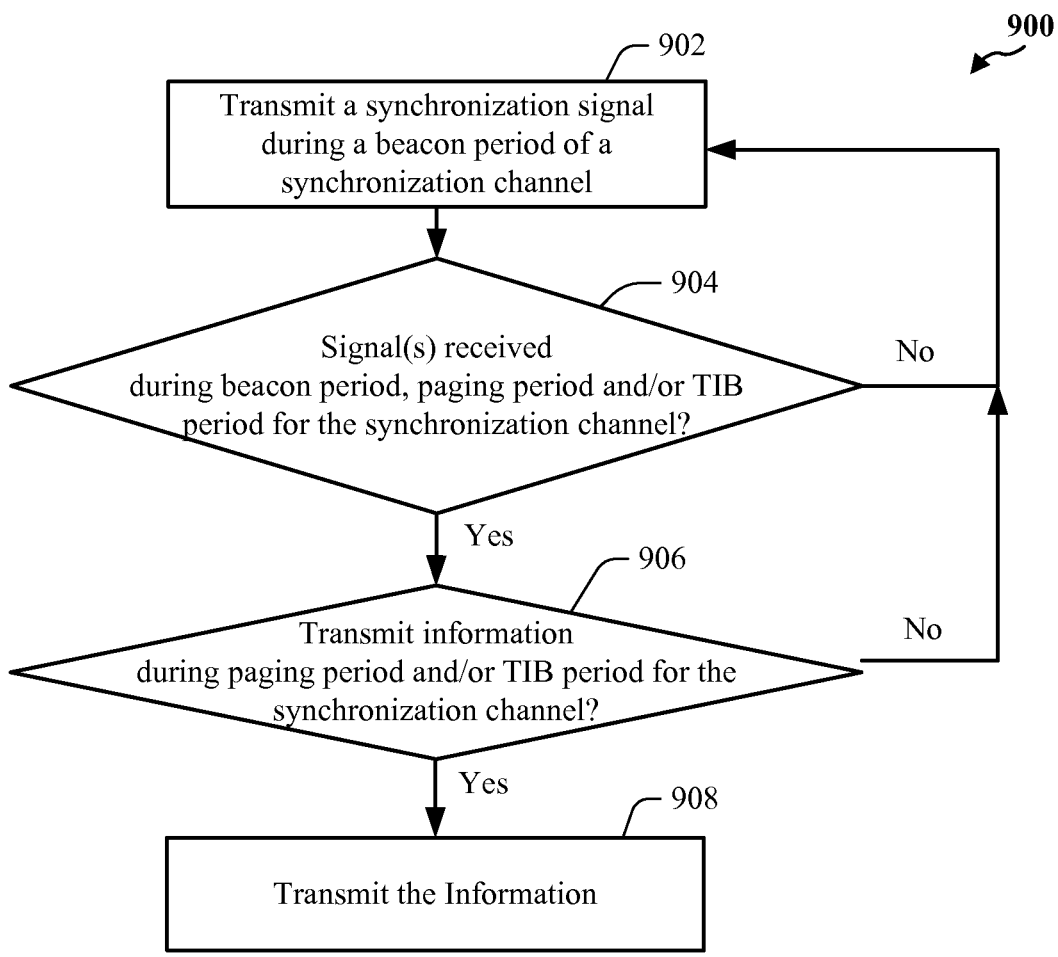
FIG. 9A is a flow chart of a first method of wireless communication.
Figure 9B:
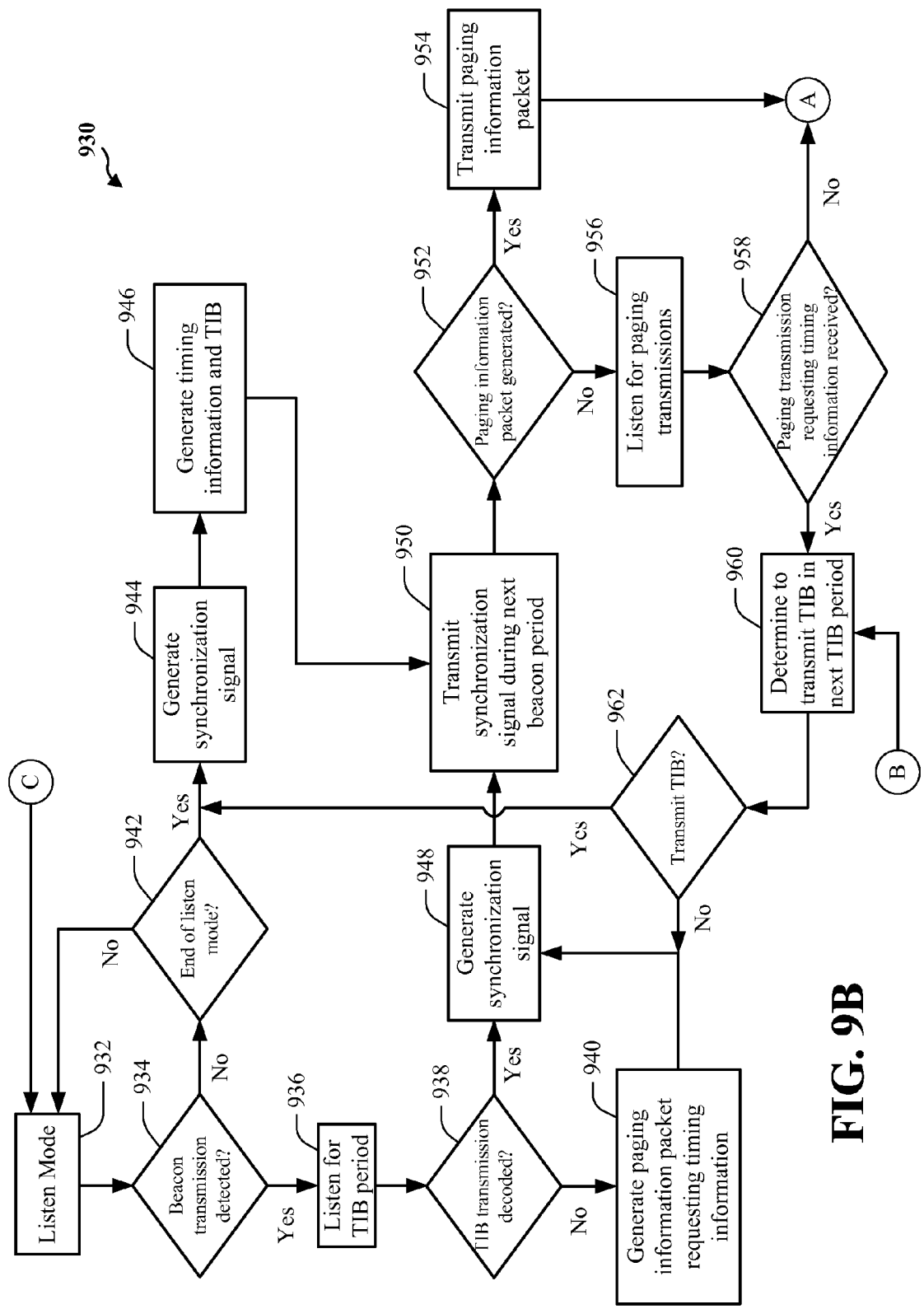
FIG. 9B is a flowchart of another method of wireless communication.
Figure 9C:
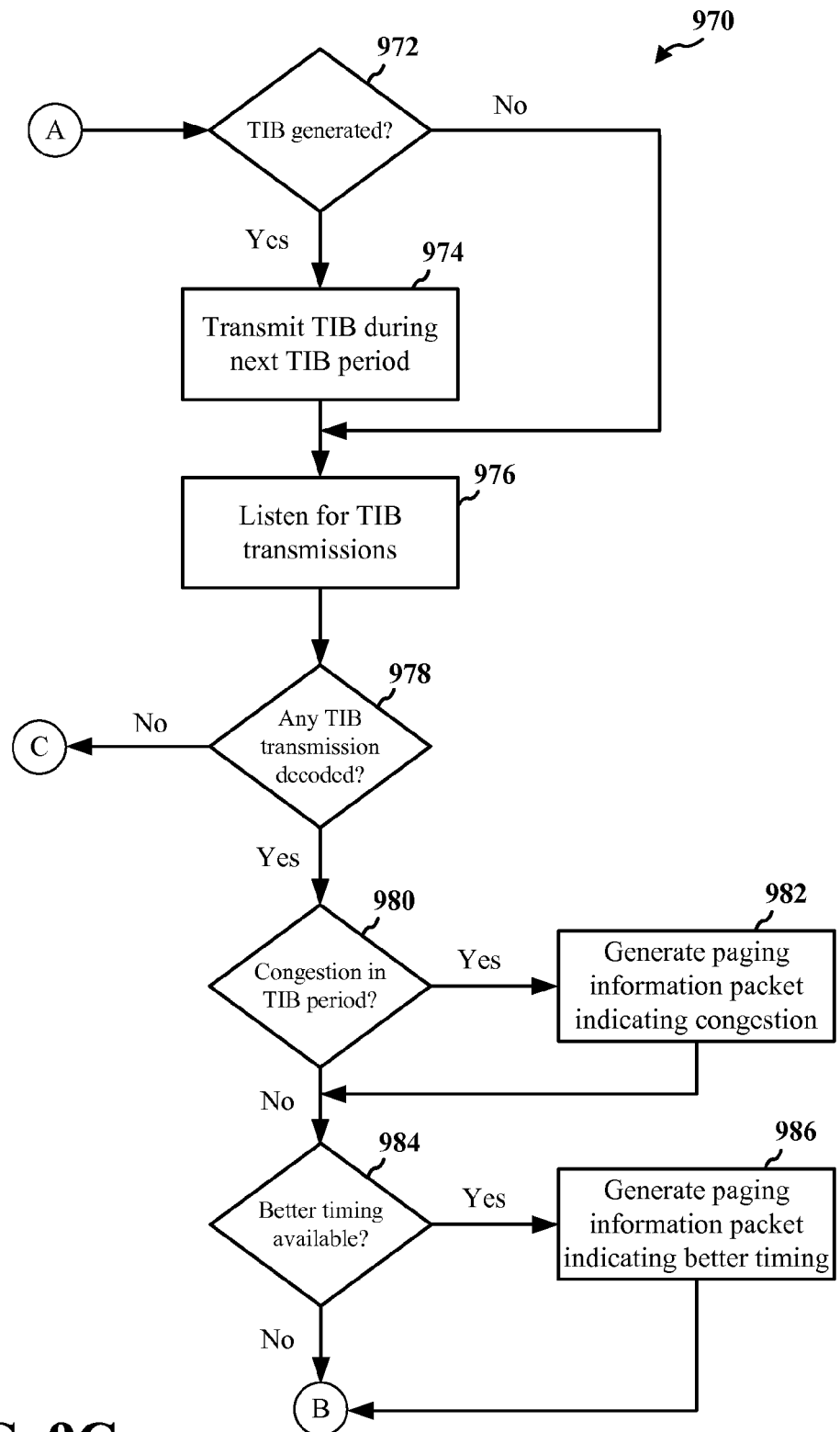
FIG. 9C is a flowchart continuing the method of FIG. 9B.

FIGS. 9A, 9B, and 9C illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could be performed as a series of interrelated states or events, and/or substantially in parallel. Further, the various methodologies described in the blocks below may be performed individually or in any combination.

FIG. 9A is a flowchart of a first method 900 of wireless communication. The method may be performed by a UE in a D2D network that is configured with distributed synchronization.

At block 902, the UE may transmit a synchronization signal during a beacon period of a synchronization channel. For example, apparatus 1002 internal timing information module 1008 may provide the synchronization signal 1020 for transmission by transmission module 1012. In an aspect, the synchronization channel may include the beacon period, a paging period, and a TIB period. In such an aspect, the synchronization signal may include information associated with the timing structure used in the D2D network. Further, in such an aspect, the TIB period may include 10 or more orthogonal resources. In another aspect, the TIB may include a frame structure used in a timing structure for the D2D network, an age of the timing structure, a resource ID on which the information is being transmitted, timing related information associated with at least one of a currently timing structure or a proposed timing structure, etc., or any combination thereof.

At block 904, the UE monitoring at least the paging period and/or the TIB period of the synchronization channel for one or more signals from one or more UEs in the D2D network. For example, the reception module 1004 may monitor for signals 1022 received from one or more UEs 804-810 in the D2D network 800. In another aspect, the UE may monitor for a beacon transmission during the beacon period. In another aspect, the UE may monitor for and receive a request for timing related information for the D2D network during the paging period. If at block 904, the UE does not detect any signals during the paging period and/or the TIB period of the synchronization channel, then the UE may return to transmitting during a subsequent instance of the beacon period of the synchronization channel at block 902.

If at block 904, the UE monitor for any received at least one signal from the one or more UEs in the D2D network, then at block 906, the UE determining whether to transmit information during at least one of the paging period or the TIB period. If the UE determines that no information is to be transmitted, then the UE may return to transmitting during a subsequent instance of the beacon period of the synchronization channel at block 902. If the UE determines there is information to be transmitted, then at block 908 the UE may transmit the information. For example, the reception module 1004 may provide any received signals 1022 to timing information processing module 1006 which may provide an indication 1024 to timing information transmission determination module 1010 as to whether any timing information has been requested. In another example aspect, reception module 1004 may receive superior timing information from, for example a network entity 818, and may provide an indication 1024 to timing information transmission determination module 1010 as to whether any timing information is to be broadcast. Timing information transmission module 1010 may process the indication(s) 1024 and determine what information 1026 to transmit and during which period (e.g., paging period, TIB period, etc.) the information 1026 is to be transmitted by transmission module 1012. In an aspect, the determination may be based on information received through a WAN, information received during the paging period, etc. In an aspect, the UE may determine that it is unable to decode information received during a TIB period, and in response may transmit paging information during the paging period. In an aspect, where the UE may determine that it has information to transmit during the TIB period and also that more than a threshold number of resources are being used during the TIB period, then the UE may transmit a resource congestion indication during the paging period. In another aspect, where the UE the presence of a superior timing structure, then the UE may transmit an indication of availability of the superior timing structure during the paging period. In an aspect, the UE may receive a timing information request during the paging period, and may transmit the timing information during the TIB period. In another aspect, where the UE detects no signals during the paging or TIB periods, the UE may transmit a synchronization signal during the beacon period and/or timing related information during the TIB period.

FIG. 9B is a flowchart of another method 930 of wireless communication. The method may be performed by a UE in a D2D network that is configured with distributed synchronization. FIG. 9C is a flowchart 970 continuing the method 930 of FIG. 9B.

At block 932, the UE is in a listen mode where the UE may monitor at least one of a beacon period, a paging period, or a timing information block (TIB) period for signals from one or more UEs in the D2D network. The beacon period, the paging period, and the TIB period may be part of a synchronization channel. At block 934, the UE determines whether a beacon transmission is detected. When no beacon transmission is detected, the UE determines at block 942 whether the listen mode has ended. If the listen mode has not ended, the UE reverts back to block 932 and continues to monitor at least one of the beacon period, the paging period, or the timing information block (TIB) period. If the listen mode has ended, the UE proceeds to block 944 to generate a synchronization signal. At block 946, the UE generates timing information and the TIB and then transmits, at block 950, the synchronization signal during a next beacon period.

When the beacon transmission is detected at block 934, the UE proceeds to block 936 to listen for a TIB period. Thereafter, at block 938, the UE determines whether a TIB transmission is decoded. If no TIB transmission is decoded, the UE at block 940 generates a paging information packet requesting timing information. The UE then proceeds to block 948 to generate a synchronization signal. If the TIB transmission is detected at block 938, the UE directly proceeds to block 948 to generate the synchronization signal. The UE then proceeds to block 950 to transmit the synchronization signal during a next beacon period.

At block 952, the UE determines whether a paging information packet is generated. If the paging information packet is generated, the UE at block 954 transmits the paging information packet. The UE then proceeds to block 972.

If the paging information packet is not generated, the UE at block 956 listens for paging transmissions. At block 958, the UE determines whether a paging transmission requesting timing information is received. If no paging transmission is received, the UE proceeds to block 972. However, if the paging transmission is received, the UE at block 960 determines to transmit the TIB during a next TIB period. The UE then proceeds to block 962 to determine whether to transmit the TIB. If the UE determines to transmit the TIB, the UE proceeds to block 944 to generate a synchronization signal and continue the operation accordingly. However, if the UE determines to not transmit the TIB, the UE proceeds to block 948 to generate a synchronization signal and continue the operation accordingly.

At block 972, the UE determines whether the TIB is generated. If the TIB is generated, the UE at block 974 transmits the TIB during a next TIB period. Thereafter, at block 976, the UE listens for TIB transmissions. If the TIB is not generated at block 972, the UE directly proceeds to block 976 to listen for TIB transmissions.

At block 978, the UE determines whether any TIB transmission is decoded. If no TIB transmission is decoded, the UE reverts back to the listen mode at block 932. If a TIB transmission is decoded, the UE at block 980 determines whether congestion exists in the TIB period. If the congestion exists, the UE at block 982 generates a paging information packet indicating congestion. Thereafter, the UE at block 984 determines whether better timing is available. If the congestion does not exist at block 980, the UE directly proceeds to block 984.

If the better timing is available at block 984, the UE at block 986 generates a paging information packet indicating the better timing. Thereafter, the UE proceeds to block 960 and continues the operation accordingly. If the better timing is not available at block 984, the UE directly proceeds to block 960 to continue the operation.

Figure 10:
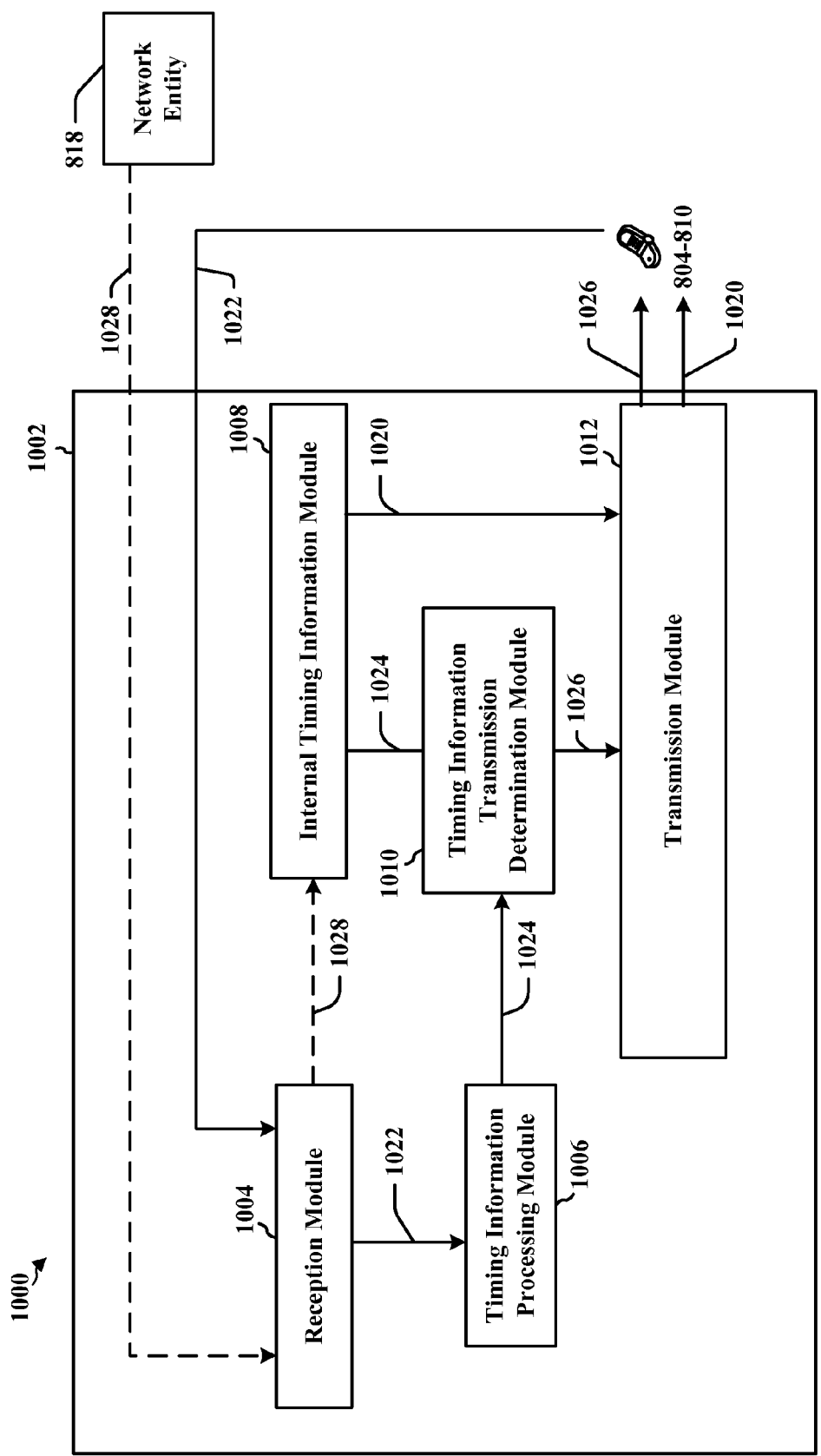
FIG. 10 is a conceptual data flow diagram illustrating the data flow between different modules/means/components in an exemplary apparatus.

FIG. 10 is a conceptual data flow diagram 1000 illustrating the data flow between different modules/means/components in an example apparatus 1002. The apparatus may be a UE (e.g., UE 802-810). As described with reference to FIG. 9 the apparatus 1002 includes a reception module 1004, timing information processing module 1006, internal timing information module 1008, timing information transmission determination module 1010, and transmission module 1012.

The apparatus may include additional modules that perform each of the steps of the algorithm in the aforementioned flow charts of FIGS. 9A, 9B, and 9C. As such, each block in the aforementioned flow charts of FIGS. 9A, 9B, and 9C may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
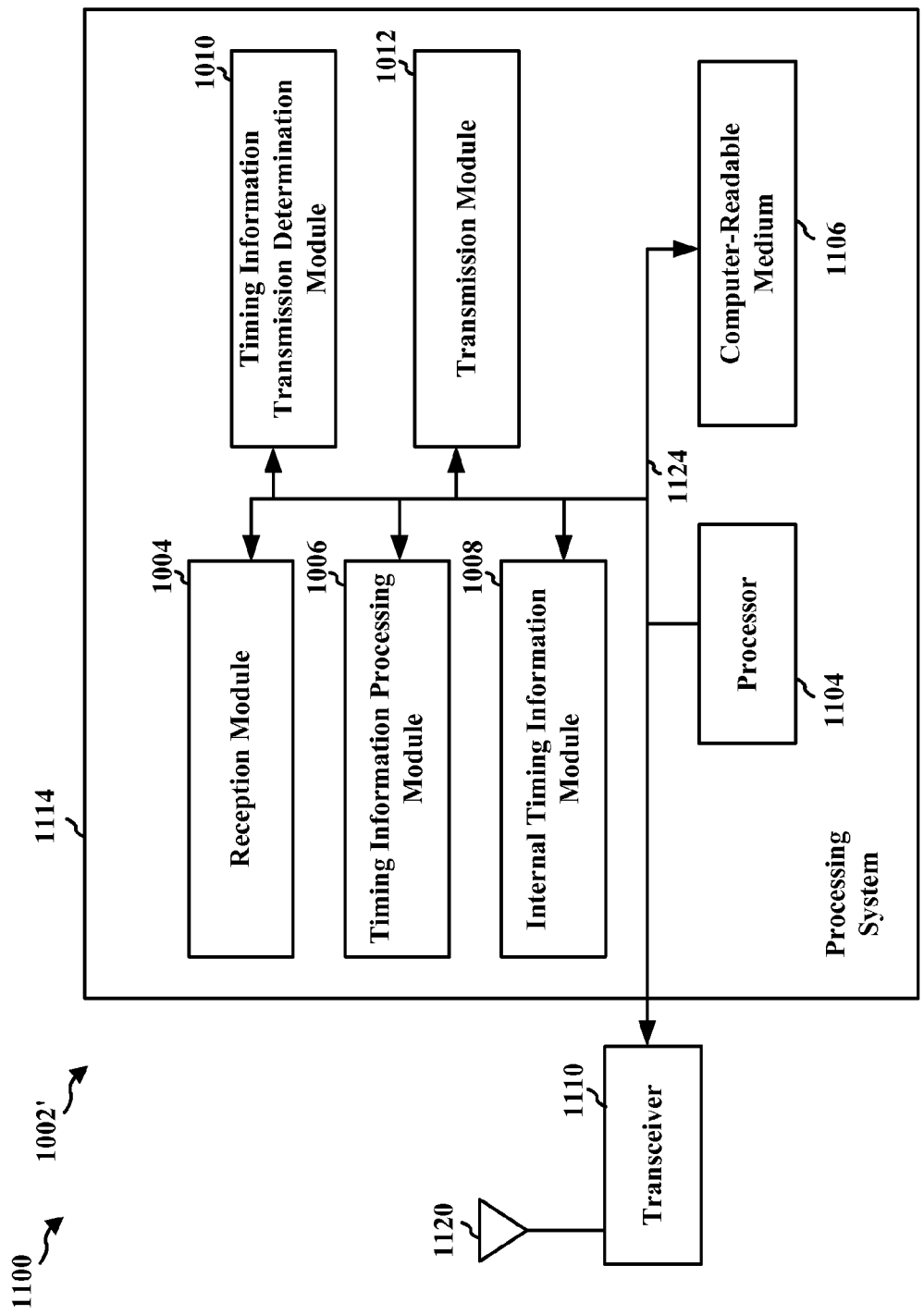
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific Application of the processing system 1114 and the overall design constraints. The bus 1124 links together various circuits including one or more processors and/or hardware modules, represented by the processor 1104, the modules 1004, 1006, 1008, 1010, 1012, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, 1010, and 1012. The modules may be software modules running in the processor 1104, resident/stored in the computer-readable medium 1106, one or more hardware modules coupled to the processor 1104, or some combination thereof. The processing system 1114 may be a component of the UE 550 and may include the memory 560 and/or at least one of the TX processor 568, the RX processor 556, and the controller/processor 559.

In one configuration, the apparatus 1002/1002' for wireless communication, in a D2D network with distributed synchronization, includes means for transmitting a synchronization signal during a beacon period of a synchronization channel, means for monitoring at least one of the beacon period, the paging period or the TIB period of the synchronization channel for one or more signals from one or more UEs in the D2D network, and means for determining whether to transmit information during at least one of the paging period or the TIB period based at least in part on the monitoring. In an aspect, the synchronization channel may include the beacon period, the paging period, and the TIB period. In an aspect, the apparatus 1002/1002' means for monitoring may be further configured to monitor for a beacon transmission during the beacon period, and the means for determining may be further configured to determine that information is not able to be decoded during the TIB period. In such an aspect, the apparatus 1002/1002' may further include means for transmitting paging information during the paging period. In an aspect, the apparatus 1002/1002' means for determining may be further configured to determine that the apparatus has information to be transmitted during the TIB period, and determine that more than a threshold number of resources are being used during the TIB period. In such an aspect, the apparatus 1002/1002' may further include means for transmitting a resource congestion indication during the paging period. In an aspect, the apparatus 1002/1002' means for determining may be further configured to determine that a superior timing structure is available. In such an aspect, the apparatus 1002/1002' may further include means for transmitting an indication of availability of the superior timing structure during the paging period. In an aspect, the apparatus 1002/1002' means for determining may be further configured to determine whether to transmit information during the TIB period based on information received through a WAN, information received during the paging period, etc. In an aspect, the apparatus 1002/1002' means for monitoring may be further configured to receive a request during the paging period, and the means for determining may be further configured to determine that the request is for timing related information for the D2D network. In such an aspect, the apparatus 1002/1002' may further include means for transmitting the timing related information during the TIB period. In an aspect, the apparatus 1002/1002' means for monitoring may be further configured to not detect signals during the paging period or TIB period. In such an aspect, the apparatus 1002/1002' may further include means for transmitting the synchronization signal during the beacon period of the synchronization channel, or transmitting the timing related information during the TIB period of the synchronization channel.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 568, the RX Processor 556, and the controller/processor 559. As such, in one configuration, the aforementioned means may be the TX Processor 568, the RX Processor 556, and the controller/processor 559 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications for a user equipment (UE) in a device-to-device (D2D) network with distributed synchronization, comprising:
    monitoring at least one of a beacon period, a paging period, or a timing information block (TIB) period for one or more signals from one or more UEs in the D2D network, wherein the monitoring includes monitoring for beacon transmissions during the beacon period and for timing information during the TIB period, and wherein the beacon period, the paging period, and the TIB period are included in a synchronization channel;
    deciding whether to transmit a synchronization signal during a subsequent beacon period of the synchronization channel based at least on the monitoring;
    determining whether to transmit information during at least one of a subsequent paging period or a subsequent TIB period based at least on the monitoring, wherein the determining includes determining that a beacon transmission is detected during the beacon period and determining that the timing information is not decoded during the TIB period; and
    transmitting paging information including a request to transmit timing related information of the D2D network during the subsequent paging period based on the determination that the timing information is not decoded during the TIB period.

2. The method of claim 1, wherein the determining further comprises determining that a superior timing structure is available, and further includes:
    transmitting an indication of availability of the superior timing structure during the paging period.

3. The method of claim 1, wherein the deciding to transmit the synchronization signal comprises:
  detecting a beacon transmission from the one or more UEs during the beacon period; and
  decoding timing information from at least one transmission in the TIB period.

4. The method of claim 1, wherein the determining further comprises determining whether to transmit information during the TIB period based on at least one of:
  information received through a wireless access network (WAN);
  information received during the TIB period; or
  information received during the paging period.

5. The method of claim 1, wherein the synchronization signal includes information associated with a timing structure for the D2D network and wherein the TIB period includes 10 or more orthogonal resources.

6. A method of wireless communications for a user equipment (UE) in a device-to-device (D2D) network with distributed synchronization, comprising:
  monitoring at least one of a beacon period, a paging period, or a timing information block (TIB) period for one or more signals from one or more UEs in the D2D network, wherein the beacon period, the paging period, and the TIB period are included in a synchronization channel;
  deciding whether to transmit a synchronization signal during a subsequent beacon period of the synchronization channel based at least on the monitoring;
  determining whether to transmit information during at least one of a subsequent paging period or a subsequent TIB period based at least on the monitoring, wherein the determining includes determining that the UE has information to be transmitted during the TIB period, and determining that a number of resources being used during the TIB period is larger than a threshold; and
  transmitting a resource congestion indication during the subsequent paging period based on the determination that the number of resources being used during the TIB period is larger than the threshold.

7. The method of claim 6, wherein the information to be transmitted during the TIB period comprises at least one of:
  a frame structure used in a timing structure for the D2D network;
  an age of the timing structure;
  a resource ID on which the information is being transmitted; or
  timing related information associated with at least one of a current timing structure or a proposed timing structure.

8. A method of wireless communications for a user equipment (UE) in a device-to-device (D2D) network with distributed synchronization, comprising:
  monitoring at least one of a beacon period, a paging period, or a timing information block (TIB) period for one or more signals from one or more UEs in the D2D network, wherein the beacon period, the paging period, and the TIB period are included in a synchronization channel, and wherein the monitoring
  receiving a request during the paging period;
  deciding whether to transmit a synchronization signal during a subsequent beacon period of the synchronization channel based at least on the monitoring;
  determining whether to transmit information during at least one of a subsequent paging period or a subsequent TIB period based at least on the monitoring, wherein the determining includes determining that the request is for timing related information for the D2D network; and
  transmitting the timing related information during the subsequent TIB period.

9. A method of wireless communications for a user equipment (UE) in a device-to-device (D2D) network with distributed synchronization, comprising:
  monitoring at least one of a beacon period, a paging period, or a timing information block (TIB) period for one or more signals from one or more UEs in the D2D network and detecting no signals during the paging period or TIB period, wherein the beacon period, the paging period, and the TIB period are included in a synchronization channel;
  deciding whether to transmit a synchronization signal during a subsequent beacon period of the synchronization channel based at least on the monitoring;
  determining whether to transmit information during at least one of a subsequent paging period or a subsequent TIB period based at least on the monitoring; and
  transmitting the synchronization signal during the subsequent beacon period of the synchronization channel or transmitting timing related information for the D2D network during the subsequent TIB period of the synchronization channel.

10. An apparatus of wireless communications in a device-to-device (D2D) network with distributed synchronization, comprising:
  means for monitoring at least one of a beacon period, a paging period, or a timing information block (TIB) period for one or more signals from one or more user equipments (UEs) in the D2D network, wherein the beacon period, the paging period, and the TIB period are included in a synchronization channel, and wherein the means for monitoring are further configured to monitor for beacon transmissions during the beacon period and for timing information during the TIB period;
  means for deciding whether to transmit a synchronization signal during a subsequent beacon period of the synchronization channel based at least on the monitoring;
  means for determining whether to transmit information during at least one of a subsequent paging period or a subsequent TIB period based at least on the monitoring, wherein the means for determining are further configured to determine that a beacon transmission is detected during the beacon period and determine that the timing information is not decoded during the TIB period; and
  means for transmitting paging information including a request to transmit timing related information of the D2D network during the subsequent paging period based on the determination that the timing information is not decoded during the TIB period.

11. The apparatus of claim 10, wherein the means for determining are further configured to determine that a superior timing structure is available, and further comprising:
  means for transmitting an indication of availability of the superior timing structure during the paging period.

12. The apparatus of claim 10, wherein the means for deciding to transmit the synchronization signal is configured to:
  detect a beacon transmission from the one or more UEs during the beacon period; and
  decode timing information from at least one transmission in the TIB period.

13. The apparatus of claim 10, wherein the means for determining are further configured to determine whether to transmit information during the TIB period based on at least one of:
   information received through a wireless access network (WAN);
   information received during the TIB period; or
   information received during the paging period.

14. The apparatus of claim 10, wherein the synchronization signal includes information associated with a timing structure for the D2D network and wherein the TIB period includes 10 or more orthogonal resources.

15. An apparatus of wireless communications in a device-to-device (D2D) network with distributed synchronization, comprising:
   means for monitoring at least one of a beacon period, a paging period, or a timing information block (TIB) period for one or more signals from one or more user equipments (UEs) in the D2D network, wherein the beacon period, the paging period, and the TIB period are included in a synchronization channel;
   means for deciding whether to transmit a synchronization signal during a subsequent beacon period of the synchronization channel based at least on the monitoring;
   means for determining whether to transmit information during at least one of a subsequent paging period or a subsequent TIB period based at least on the monitoring, wherein the means for determining are further configured to:
      determine that the apparatus has information to be transmitted during the TIB period; and
      determine that a number of resources being used during the TIB period is larger than a threshold, and:
   means for transmitting a resource congestion indication during the subsequent paging period based on the determination that the number of resources being used during the TIB period is larger than the threshold.

16. The apparatus of claim 15, wherein the information to be transmitted during the TIB period comprises at least one of:
   a frame structure used in a timing structure for the D2D network;
   an age of the timing structure;
   a resource ID on which the information is being transmitted; or
   timing related information associated with at least one of a current timing structure or a proposed timing structure.

17. An apparatus of wireless communications in a device-to-device (D2D) network with distributed synchronization, comprising:
   means for monitoring at least one of a beacon period, a paging period, or a timing information block (TIB) period for one or more signals from one or more user equipments (UEs) in the D2D network, wherein the beacon period, the paging period, and the TIB period are included in a synchronization channel, wherein the means for monitoring are further configured to receive a request during the paging period;
   means for deciding whether to transmit a synchronization signal during a subsequent beacon period of the synchronization channel based at least on the monitoring;
   means for determining whether to transmit information during at least one of a subsequent paging period or a subsequent TIB period based at least on the monitoring, wherein the means for determining are further configured to determine that the request is for timing related information for the D2D network; and
   means for transmitting the timing related information during the subsequent TIB period.

18. An apparatus of wireless communications in a device-to-device (D2D) network with distributed synchronization, comprising:
   means for monitoring at least one of a beacon period, a paging period, or a timing information block (TIB) period for one or more signals from one or more user equipments (UEs) in the D2D network, wherein the beacon period, the paging period, and the TIB period are included in a synchronization channel, wherein the means for monitoring are further configured to detect no signals during the paging period or TIB period;
   means for deciding whether to transmit a synchronization signal during a subsequent beacon period of the synchronization channel based at least on the monitoring;
   means for determining whether to transmit information during at least one of a subsequent paging period or a subsequent TIB period based at least on the monitoring; and
   means for transmitting at least one of the synchronization signal during the subsequent beacon period of the synchronization channel or timing related information for the D2D network during the subsequent TIB period of the synchronization channel.

19. An apparatus for communication in a device-to-device (D2D) network with distributed synchronization, comprising:
   a memory configured to store data; and
   one or more processors communicatively coupled with the memory, wherein the one or more processors and the memory are configured to:
      monitor at least one of a beacon period, a paging period, or a timing information block (TIB) period for one or more signals from one or more UEs in the D2D network, wherein the beacon period, the paging period, and the TIB period are included in a synchronization channel, and wherein the one or more processors and the memory are further configured to monitor for beacon transmissions during the beacon period and for timing information during the TIB period;
      decide whether to transmit a synchronization signal during a subsequent beacon period of the synchronization channel based at least on the monitoring;
      determine whether to transmit information during at least one of a subsequent paging period or a subsequent TIB period based at least on the monitoring, wherein the one or more processors and the memory are further configured to determine that a beacon transmission is detected during the beacon period and determine that the timing information is not decoded during the TIB period; and
      transmit paging information including a request to transmit timing related information of the D2D network during the subsequent paging period based on the determination that the timing information is not decoded during the TIB period.

20. The apparatus of claim 19, wherein the one or more processors and the memory are further configured to:
   determine that a superior timing structure is available; and
   transmit an indication of availability of the superior timing structure during the paging period.

21. The apparatus of claim 19, wherein the one or more processors and the memory are further configured to:

detect a beacon transmission from the one or more UEs during the beacon period; and decode timing information from at least one transmission in the TIB period.

22. The apparatus of claim 19, wherein the one or more processors and the memory are further configured to:

determine whether to transmit information during the TIB period based on at least one of:

information received through a wireless access network (WAN);

information received during the TIB period; or information received during the paging period.

23. An apparatus for communication in a device-to-device (D2D) network with distributed synchronization, comprising:

a memory configured to store data; and one or more processors communicatively coupled with the memory, wherein the one or more processors and the memory are configured to:

monitor at least one of a beacon period, a paging period, or a timing information block (TIB) period for one or more signals from one or more UEs in the D2D network, wherein the beacon period, the paging period, and the TIB period are included in a synchronization channel;

decide whether to transmit a synchronization signal during a subsequent beacon period of the synchronization channel based at least on the monitoring;

determine whether to transmit information during at least one of a subsequent paging period or a subsequent TIB period based at least on the monitoring, wherein the one or more processors and the memory are further configured to:

determine that the apparatus has information to be transmitted during the TIB period;

determine that a number of resources being used during the TIB period is larger than a threshold; and transmit a resource congestion indication during the subsequent paging period based on the determination that the number of resources being used during the TIB period is larger than the threshold.

24. The apparatus of claim 23, wherein the information to be transmitted during the TIB period comprises at least one of:

a frame structure used in a timing structure for the D2D network;

an age of the timing structure;

a resource ID on which the information is being transmitted; or timing related information associated with at least one of a current timing structure or a proposed timing structure.

25. An apparatus for communication in a device-to-device (D2D) network with distributed synchronization, comprising:

a memory configured to store data; and one or more processors communicatively coupled with the memory, wherein the one or more processors and the memory are configured to:

monitor at least one of a beacon period, a paging period, or a timing information block (TIB) period for one or more signals from one or more UEs in the D2D network, wherein the beacon period, the paging period, and the TIB period are included in a synchronization channel;

decide whether to transmit a synchronization signal during a subsequent beacon period of the synchronization channel based at least on the monitoring; and determine whether to transmit information during at least one of a subsequent paging period or a subsequent TIB period based at least on the monitoring, and wherein the one or more processors and the memory are further configured to:

receive a request during the paging period;

determine that the request is for timing related information for the D2D network; and transmit the timing related information during the subsequent TIB period.

26. An apparatus for communication in a device-to-device (D2D) network with distributed synchronization, comprising:

a memory configured to store data; and one or more processors communicatively coupled with the memory, wherein the one or more processors and the memory are configured to:

monitor at least one of a beacon period, a paging period, or a timing information block (TIB) period for one or more beacon transmissions from one or more UEs in the D2D network, wherein the beacon period, the paging period, and the TIB period are included in a synchronization channel;

decide whether to transmit a synchronization signal during a subsequent beacon period of the synchronization channel based at least on the monitoring;

determine whether to transmit information during at least one of a subsequent paging period or a subsequent TIB period based at least on the monitoring, and wherein the one or more processors and the memory are further configured to:

detect no signals during the paging period or TIB period, and transmit the synchronization signal during the beacon period of the synchronization channel or transmit timing related information for the D2D network during the TIB period of the synchronization channel.

27. A non-transitory computer readable medium storing computer executable code at a user equipment (UE) in a device-to-device (D2D) network with distributed synchronization, comprising:

code for monitoring at least one of a beacon period, a paging period, or a timing information block (TIB) period for one or more signals from one or more UEs in the D2D network, wherein the monitoring includes monitoring for beacon transmissions during the beacon period and for timing information during the TIB period, and wherein the beacon period, the paging period, and the TIB period are included in a synchronization channel;

code for deciding whether to transmit a synchronization signal during a subsequent beacon period of the synchronization channel based at least on the monitoring;

code for determining whether to transmit information during at least one of a subsequent paging period or a subsequent TIB period based at least on the monitoring, wherein the code for determining includes code for determining that a beacon transmission is detected during the beacon period and determining that the timing information is not decoded during the TIB period; and code for transmitting paging information including a request to transmit timing related information of the D2D network during the subsequent paging period based on the determination that the timing information is not decoded during the TIB period.

28. A non-transitory computer readable medium storing computer executable code at a user equipment (UE) in a device-to-device (D2D) network with distributed synchronization, comprising:
    code for monitoring at least one of a beacon period, a paging period, or a timing information block (TIB) period for one or more signals from one or more UEs in the D2D network, wherein the beacon period, the paging period, and the TIB period are included in a synchronization channel;
    code for deciding whether to transmit a synchronization signal during a subsequent beacon period of the synchronization channel based at least on the monitoring;
    code for determining whether to transmit information during at least one of a subsequent paging period or a subsequent TIB period based at least on the monitoring, wherein the code for determining further includes code for:
        determining that the UE has information to be transmitted during the TIB period; and
        determining that a number of resources being used during the TIB period is larger than a threshold; and
    transmitting a resource congestion indication during the subsequent paging period based on the determination that the number of resources being used during the TIB period is larger than the threshold.

29. A non-transitory computer readable medium storing computer executable code at a user equipment (UE) in a device-to-device (D2D) network with distributed synchronization, comprising:
    code for monitoring at least one of a beacon period, a paging period, or a timing information block (TIB) period for one or more signals from one or more UEs in the D2D network, wherein the beacon period, the paging period, and the TIB period are included in a synchronization channel, wherein the monitoring further includes receiving a request during the paging period;
    code for deciding whether to transmit a synchronization signal during a subsequent beacon period of the synchronization channel based at least on the monitoring;
    code for determining whether to transmit information during at least one of a subsequent paging period or a subsequent TIB period based at least on the monitoring, wherein the code for determining further includes code for determining that the request is for timing related information for the D2D network; and
    code for transmitting the timing related information during the subsequent TIB period.

30. A non-transitory computer readable medium storing computer executable code at a user equipment (UE) in a device-to-device (D2D) network with distributed synchronization, comprising:
    code for monitoring at least one of a beacon period, a paging period, or a timing information block (TIB) period for one or more signals from one or more UEs in the D2D network, wherein the beacon period, the paging period, and the TIB period are included in a synchronization channel, wherein the monitoring further includes detecting no signals during the paging period or TIB period;
    code for deciding whether to transmit a synchronization signal during a subsequent beacon period of the synchronization channel based at least on the monitoring;
    code for determining whether to transmit information during at least one of a subsequent paging period or a subsequent TIB period based at least on the monitoring; and
    code for transmitting the synchronization signal during the beacon period of the synchronization channel or transmitting timing related information for the D2D network during the subsequent TIB period of the synchronization channel.

* * * * *